United States Patent
Shimoyama (10) Patent No.: US 10,543,644 B2
(45) Date of Patent: Jan. 28, 2020

(54) NOZZLE AND LAYERED OBJECT MANUFACTURING APPARATUS

(71) Applicant: Kabushiki Kaisha Toshiba, Minato-ku (JP)

(72) Inventor: Sadao Shimoyama, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 49 days.

(21) Appl. No.: 15/114,334

(22) PCT Filed: Sep. 17, 2014

(86) PCT No.: PCT/JP2014/074602
§ 371 (c)(1),
(2) Date: Jul. 26, 2016

(87) PCT Pub. No.: WO2015/141036
PCT Pub. Date: Sep. 24, 2015

(65) Prior Publication Data
US 2017/0120517 A1   May 4, 2017

(30) Foreign Application Priority Data
Mar. 18, 2014   (JP) .................................. 2014-055660

(51) Int. Cl.
*B29C 64/386* (2017.01)
*B22F 3/105* (2006.01)
(Continued)

(52) U.S. Cl.
CPC .............. *B29C 64/386* (2017.08); *B05B 7/10* (2013.01); *B05B 7/16* (2013.01); *B05B 7/1646* (2013.01); *B05B 12/18* (2018.02); *B05B 14/10* (2018.02); *B22F 3/1055* (2013.01); *B29C 64/112* (2017.08); *B29C 64/40* (2017.08);
(Continued)

(58) Field of Classification Search
None
See application file for complete search history.

(56) References Cited

U.S. PATENT DOCUMENTS 5,321,228 A * 6/1994 Krause .................... B05B 7/228
                                        219/121.64
5,418,350 A * 5/1995 Freneaux ................ B05B 7/228
                                        219/121.64
(Continued)

FOREIGN PATENT DOCUMENTS

CN   1183069 A   5/1998
CN   1411942 A   4/2003
(Continued)

OTHER PUBLICATIONS

International Search Report dated Dec. 16, 2014 in PCT/JP14/074602 Filed Sep. 17, 2014.
(Continued)

*Primary Examiner* — Jacob T Minskey
*Assistant Examiner* — Baileigh Kate Darnell
(74) *Attorney, Agent, or Firm* — Oblon, McClelland, Maier & Neustadt, L.L.P.

(57) ABSTRACT

A layered object manufacturing apparatus includes a nozzle that is provided with a body having an opening from which a laser beam is output and powder of a material is ejected.

9 Claims, 6 Drawing Sheets

(51) Int. Cl.

| | | |
|---|---|---|
| *B29C 64/209* | (2017.01) | |
| *B05B 12/18* | (2018.01) | |
| *B05B 14/10* | (2018.01) | |
| *B05B 7/16* | (2006.01) | |
| *B05B 7/10* | (2006.01) | |
| *B33Y 30/00* | (2015.01) | |
| *B33Y 50/02* | (2015.01) | |
| *B29C 64/112* | (2017.01) | |
| *B29C 64/40* | (2017.01) | |
| *B33Y 40/00* | (2015.01) | |

(52) U.S. Cl.
CPC ............... *B33Y 30/00* (2014.12); *B33Y 50/02* (2014.12); *B22F 2003/1056* (2013.01); *B33Y 40/00* (2014.12); *Y02P 10/295* (2015.11)

(56) References Cited

U.S. PATENT DOCUMENTS

| | | | | |
|---|---|---|---|---|
| 5,477,026 A | * | 12/1995 | Buongiorno | B23K 26/144 219/121.64 |
| 5,837,960 A | * | 11/1998 | Lewis | B23K 26/34 219/121.63 |
| 5,961,862 A | * | 10/1999 | Lewis | B23K 26/144 219/121.63 |
| 6,037,557 A | | 3/2000 | Sperling | |
| 6,247,657 B1 | * | 6/2001 | Finney, Jr. | B05B 1/185 239/461 |
| 6,534,745 B1 | * | 3/2003 | Lowney | B23K 26/1482 219/121.84 |
| 8,901,453 B2 | * | 12/2014 | Miyagi | B23K 26/147 219/121.63 |
| 2005/0056628 A1 | * | 3/2005 | Hu | B23K 26/144 219/121.84 |
| 2006/0065650 A1 | * | 3/2006 | Guo | B23K 26/1476 219/121.84 |
| 2007/0193981 A1 | * | 8/2007 | Peng | B23K 26/1476 219/121.33 |
| 2009/0095214 A1 | * | 4/2009 | Whitfield | C23C 26/02 118/50.1 |
| 2010/0219268 A1 | * | 9/2010 | Wurz | B05B 1/3405 239/590.5 |

FOREIGN PATENT DOCUMENTS

| | | |
|---|---|---|
| CN | 1814380 A | 8/2006 |
| CN | 101024881 A | 8/2007 |
| JP | 57-62661 U1 | 9/1980 |
| JP | 2000-130955 A | 5/2000 |
| JP | 2005-105414 A | 4/2005 |
| JP | 2007-222869 A | 9/2007 |
| JP | 2009-1900 A | 1/2009 |
| JP | 2010-172817 A | 8/2010 |

OTHER PUBLICATIONS

Japanese Office Action dated Oct. 20, 2015 in Japanese Application No. 2014-055660 Filed Mar. 18, 2014 (with English Translation).

* cited by examiner

NOZZLE AND LAYERED OBJECT MANUFACTURING APPARATUS

CROSS-REFERENCE TO RELATED APPLICATIONS

This application is national stage application of International Application No. PCT/JP2014/074602, filed Sep. 17, 2014, which designates the United States, incorporated herein by reference, and which is based upon and claims the benefit of priority from Japanese Patent Application No. 2014-055660, filed Mar. 18, 2014, the entire contents of each of which are incorporated herein by reference.

FIELD

Embodiments relate to a nozzle and a layered object manufacturing apparatus.

BACKGROUND

Conventionally, there has been known a layered object manufacturing apparatuses for forming layered objects. Such a layered object manufacturing apparatus manufactures a layered object by discharging powder of a material from a nozzle as well as outputting a laser beam, causing the powder to melt so that a layer of the material is formed thereby, and by forming the layer in plurality, on top of one another.

DETAILED DESCRIPTION

According to an embodiment, a nozzle for a layered object manufacturing apparatus, the nozzle comprises: a body having an opening from which an energy beam is output and powder of a material is ejected. A gas inlet for supplying gas is provided around the opening. A gas outlet for suctioning the gas is provided between the opening and the gas inlet.

Some exemplary embodiments and modifications of the present invention will be disclosed below. A configuration and control (technical features), and actions and results (effects) achieved by the configuration and the control according to the embodiments and the modifications described below are, however, merely exemplary.

Furthermore, the embodiments and the modifications disclosed below share some same elements. In the description below, the same elements are assigned with the same reference signs, and redundant explanations thereof are omitted herein.

Figure 1:
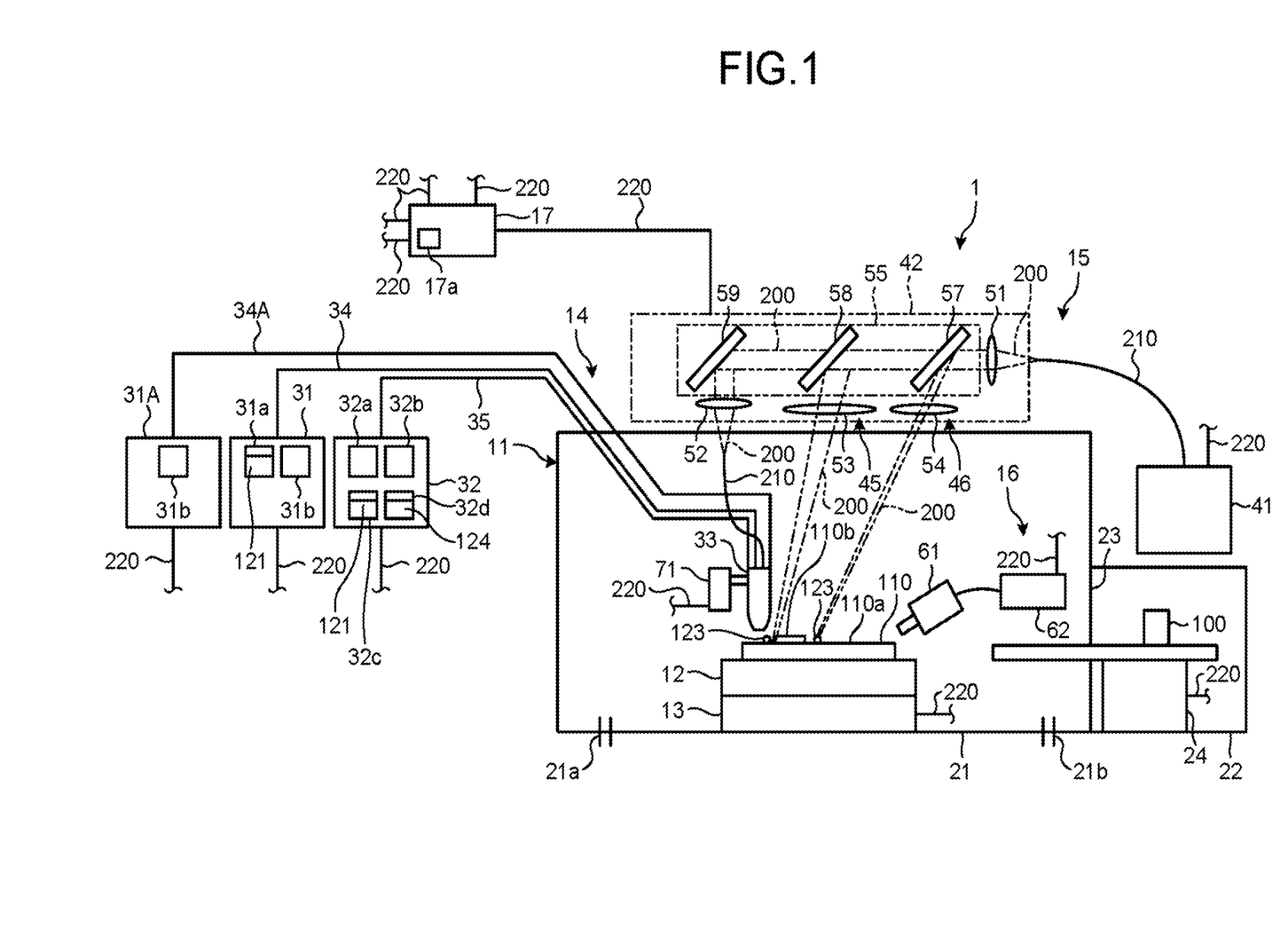
FIG. 1 is a schematic illustrating an exemplary general structure of a layered object manufacturing apparatus according to an embodiment of the present invention.

As illustrated in FIG. 1, a layered object manufacturing apparatus 1 includes a processing chamber 11, a stage 12, a moving device 13, a nozzle device 14, an optical device 15, a measuring device 16, and a control device 17.

The layered object manufacturing apparatus 1 manufactures a layered object 100 of a prescribed shape by forming a plurality of layers of a material 121 supplied from the nozzle device 14 to an object 110 placed on the stage 12.

The object 110 is an object to which the material 121 is supplied by the nozzle device 14, and includes a base 110a and a layer 110b. On a top surface of the base 110a, the layers 110b are formed. Examples of the material 121 include a metal material and a resin material in powder form. One or more materials 121 may be used in shaping the layered object 100.

The processing chamber 11 includes a main chamber 21 and a sub-chamber 22. The sub-chamber 22 is positioned adjacent to the main chamber 21. A door 23 is provided between the main chamber 21 and the sub-chamber 22. When the door 23 is opened, the main chamber 21 becomes communicated with the sub-chamber 22. When the door 23 is closed, the main chamber 21 is air-proofed.

The main chamber 21 is provided with a gas inlet 21a and a gas outlet 21b. By operating a gas charging device (not illustrated), inactive gas such as nitrogen or argon is supplied via the gas inlet 21a into the main chamber 21. By operating a gas discharging device (not illustrated), the gas in the main chamber 21 is discharged from the main chamber 21 via the gas outlet 21b.

Inside of the main chamber 21, a transfer device (not illustrated) is provided, and a conveyer device 24 is provided extending from the main chamber 21 into the sub-chamber 22. The transfer device passes the layered object 100 having been processed in the main chamber 21 onto the conveyer device 24. The conveyer device 24 conveys the layered object 100 passed from the transfer device into the sub-chamber 22. In other words, the layered object 100 having been processed in the main chamber 21 is stored in the sub-chamber 22. After the layered object 100 is stored in the sub-chamber 22, the door 23 is closed, so that the sub-chamber 22 is isolated from the main chamber 21.

The stage 12, the moving device 13, a part of the nozzle device 14, the measuring device 16, and the like are provided inside of the main chamber 21.

The stage 12 supports the object 110. The moving device 13 (moving mechanism) is capable of moving the stage 12 in three axial directions that are perpendicular to one another.

The nozzle device 14 supplies the material 121 onto the object 110 placed on the stage 12. A nozzle 33 of the nozzle device 14 irradiates the object 110, which is placed on the stage 2, with a laser beam 200. The nozzle device 14 is capable of supplying a plurality of materials 121 in parallel, and is also capable of supplying one of the materials 121 selectively. The nozzle 33 outputs the laser beam 200, in parallel with supplying the material 121. The laser beam 200 is an example of an energy beam. Any energy beam other than the laser beam may also be used, as long as such an energy beam capable of melting the material, as the laser beam, and other examples of the energy beam include an electron beam, and an electromagnetic wave within the range from microwave to ultraviolet.

The nozzle device 14 includes a supply device 31, a supply device 31A, a discharging device 32, the nozzle 33, and a supply pipe 34. The material 121 is sent from the supply device 31 into the nozzle 33 via the supply pipe 34. The supply device 31A sends the gas into the nozzle 33 via a supply pipe 34A. The material 121 is also sent from the nozzle 33 into the discharging device 32 via a discharging pipe 35.

The supply device 31 includes a tank 31a and a supplying unit 31b. The tank 31a stores the material 121. The supplying unit 31b supplies a predetermined amount of the material 121 from the tank 31a. The supply device 31 supplies carrier gas (gas) containing the powder material 121. The carrier gas is inactive gas, such as nitrogen or argon, for example. The supply device 31A includes the supplying unit 31b. The supply device 31A supplies the same type of gas (gas) supplied by the supply device 31.

The discharging device 32 includes a classifying device 32a, a discharge unit. 32b, and tanks 32c and 32d. The discharge unit 32b suctions the gas from the nozzle 33. The classifying device 32a separates the material 121 and fume. The material 121 is then stored in the tank 32c, and the fume 124 is stored in the tank 32d. Through this process, the powder of the material 121 unused in the shaping, the fume (metal fume) resulting from the shaping, dusts, and the like, together with gas, are discharged from the processing area. An example of the discharge unit 32b is a pump.

As illustrated in FIG. 1, the optical device 15 includes a light source 41 and an optical system 42. The light source 41 includes an oscillator device (not illustrated), and outputs the laser beam 200 through the oscillation of the oscillator device. The light source 41 is capable of changing the power density of a laser beam to be output.

The light source 41 is connected to the optical system 42 over a cable 210. The laser beam 200 output from the light source 41 becomes incident on the nozzle 33 via the optical system 42. The nozzle 33 then irradiates the object 110 and the material 121 that is discharged onto the object 110 with the laser beam 200.

Specifically, the optical system 42 includes a first lens 51, a second lens 52, a third lens 53, a fourth lens 54, and a galvano scanner 55. The first lens 51, the second lens 52, the third lens 53, and the fourth lens 54 are fixed. The optical system 42 may also include an adjusting device capable of moving the first lens 51, the second lens 52, the third lens 53, and the fourth lens 54 in two axial directions, more specifically, in directions intersecting with (e.g., orthogonal to) the light path.

The first lens 51 converts the laser beam 200 being incident via the cable 210 to the parallel light. The converted laser beam 200 then becomes incident on the galvano scanner 55.

The laser beam 200 output from the galvano scanner 55 is converged by the second lens 52. The laser beam 200 converged by the second lens 52 passed through the cable 210, and reaches the nozzle 33.

The laser beam 200 output from the galvano scanner 55 is converged by the third lens 53. The object 110 is then irradiated with the laser beam 200 converged by the third lens 53.

The laser beam 200 output from the galvano scanner 55 is converged by the fourth lens 54. The object 110 is then irradiated with the laser beam 200 converged by the fourth lens 54.

The galvano scanner 55 splits the parallel converted by the first lens 51 into light rays incident on the second lens 52, the third lens 53, and the fourth lens 54, respectively. The galvano scanner 55 includes a first galvano mirror 57, a second galvano mirror 58, and a third galvano mirror 59. The galvano mirrors 57, 58, and 59 are capable of splitting light, and changing their inclination angle (output angle).

A part of the laser beam 200 having passed through the first lens 51 passes through the first galvano mirror 57, and the passed laser beam 200 becomes incident on the second galvano mirror 58. The first galvano mirror 57 reflects the other part of the laser beam 200, and the reflected laser beam 200 becomes incident on the fourth lens 54. The first galvano mirror 57, by changing the inclination angle thereof, changes the position irradiated with the laser beam 200 having passed through the fourth lens 54.

A part of the laser beam 200 having passed through the first galvano mirror 57 passes through the second galvano mirror 58, and the passed laser beam 200 becomes incident on the third galvano mirror 59. The second galvano mirror 58 reflects the other part of the laser beam 200, and the reflected laser beam 200 becomes incident on the third lens 53. The second galvano mirror 58, by changing the inclination angle of thereof, changes the position irradiated with the laser beam 200 having passed through the third lens 53.

The third galvano mirror 59 outputs a part of the laser beam 200 passed through the second galvano mirror 58 to the second lens 52.

In the optical system 42, the first galvano mirror 57, the second galvano mirror 58, and the third lens 53 implement a melting device 45. The melting device 45 serves to form a layer 110b and to perform annealing, by heating the material 121 (123) that is supplied from the nozzle 33 to the object 110, by outputting the laser beam 200.

The optical system 42 also implements a removing apparatus 46 for removing the material 121. The removing apparatus 46 removes any unnecessary portion that is formed on the base 110a or on the layer 110b, by outputting the laser beam 200. Specifically, the removing apparatus 46 removes any part not making up a predetermined shape of the layered object 100, including any unnecessary portion of the material 121 scattered when the material 121 is supplied from the nozzle 33, and any unnecessary portion formed when the layer 110b is formed. The removing apparatus 46 outputs the laser beam 200 at a power density sufficient for removing such unnecessary portions.

The measuring device 16 measures the shape of the layer 110b having been solidified, and the shape of the layered object 100 having been formed. The measuring device 16 transmits information of the measured shape to the control device 17. The measuring device 16 includes a camera 61 and an image processing device 62, for example. The image processing device 62 performs image processes based on information measured by the camera 61. The measuring device 16 measures the shape of the layer 110b and the layered object 100 using optical interferometry, light-section method, for example.

The moving device 71 (moving mechanism) is capable of moving the nozzle 33 in three axial directions that are orthogonal to one another.

The control device 17 is electrically connected to the moving device 13, the conveyer device 24, the supply device 31, the supply device 31A, the discharging device 32, the light source 41, the galvano scanner 55, the image processing device 62, and the moving device 71, via a signal wire 220.

The control device 17 moves the stage 12 in the three axial directions by controlling the moving device 13. The control device 17 conveys the formed layered object 100 into the sub-chamber 22 by controlling the conveyer device 24. The control device 17 controls whether to supply the material 121, and adjusts the amount of the material to be supplied, by controlling the supply device 31. The control device 17 controls whether to discharge the powder of the material 121 or fume, and adjusts the amount discharged, by controlling the discharging device 32. The control device 17 adjusts the power density of the laser beam 200 to be output from the light source 41 by controlling the light source 41. The control device 17 adjusts the inclination angles of the first galvano mirror 57, the second galvano mirror 58, and the third galvano mirror 59 by controlling the galvano scanner 55. The control device 17 also controls the position of the nozzle 33, by controlling the moving device 71.

The control device 17 is provided with a storage unit 17a. The storage unit 17a stores therein data representing the shape of the layered object 100 to be formed (reference shape), for example. The storage unit 17a also stores therein data representing the height of the nozzle 33 and the height of the stage 12 at each three-dimensional processing position (point).

The control device 17 may have a function of supplying a plurality of different materials 121 from the nozzle 33 selectively, and adjusting (changing) the ratio of the materials 121. For example, the control device 17 controls the supply device 31 and the like based on the data representing the ratio of the materials 121 stored in the storage unit 17a so that the layer 110b of the materials 121 is formed at that ratio. This function enables shaping of a graded material (functionally graded material) in which the ratio of the materials 121 changes (degreases or increases gradually) across the positions (locations) of the layered object 100. Specifically, when a layer 110b is formed, the layered object 100 can be shaped as a graded material (functionally graded material) in which the ratio of the materials 121 changes in some three-dimensional directions by the control device 17 controlling the supply device 31 to yield the ratio of the materials 121 set (stored) for respective positions in the three-dimensional coordinates of the layered object 100, for example. The amount of change in the ratio of the material 121 (the ratio of change) per unit length can be set variously.

The control device 17 has a function of determining the shape of the material 121. For example, the control device 17 determines whether there is any portion that is outside of the predetermined shape, by comparing the shape of the layer 110b or the shape of the layered object 100 acquired by the measuring device 16 with the reference shape stored in the storage unit 17a.

The control device 17 also has a function of trimming the material 121 to the predetermined shape by removing the unnecessary portion determined to be outside of the predetermined shape, in the determination of the shape of the material 121. For example, if the material 121 becomes scattered and adheres to a portion that is outside of the predetermined shape, the control device 17 first controls the light source 41 in such a manner that the laser beam 200 output from the fourth lens 54 via the first galvano mirror 57 is brought to have the power density capable of vaporizing the material 121. The control device 17 then controls the first galvano mirror and vaporizes the material 121 by irradiating the portion with the laser beam 200.

Figure 2:
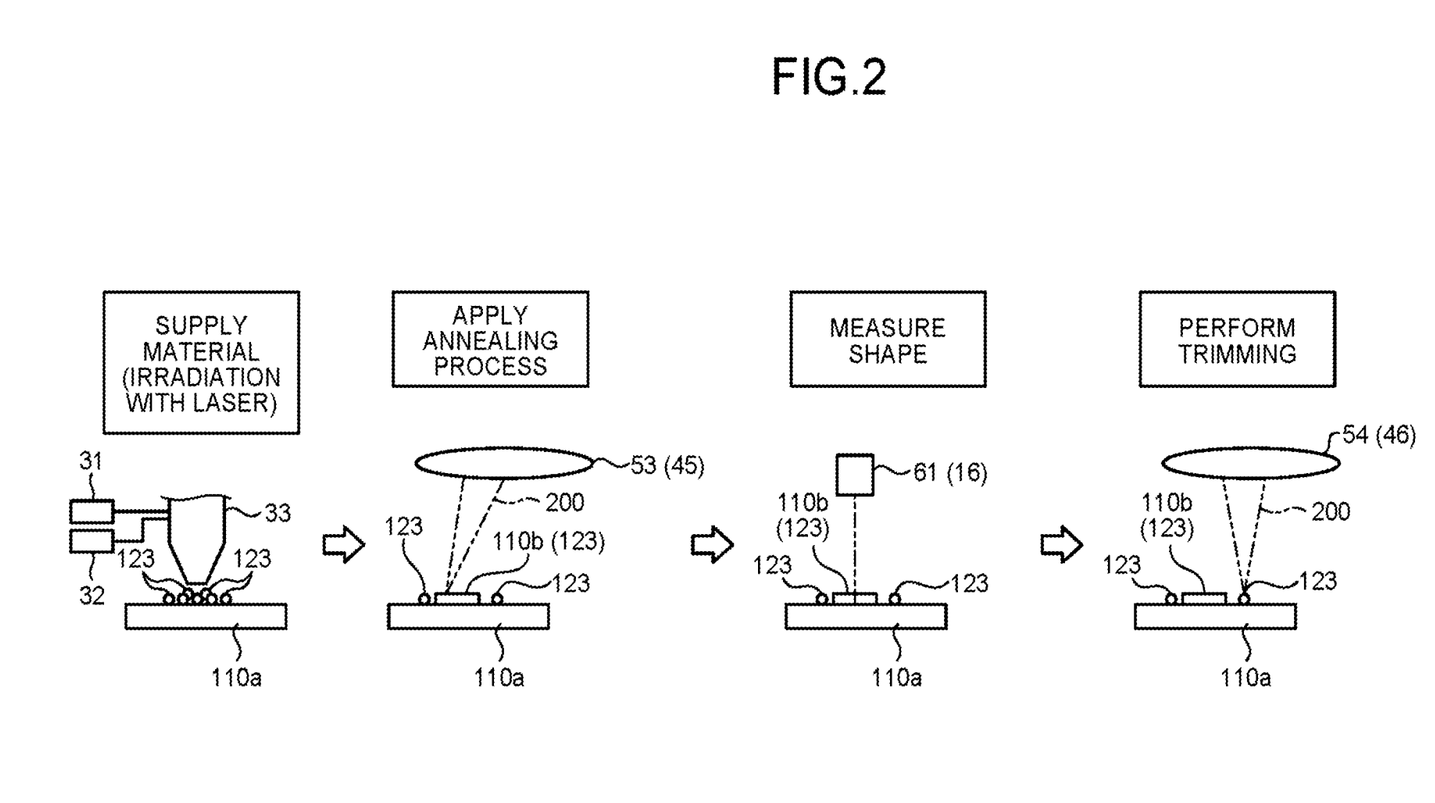
FIG. 2 is a schematic for explaining exemplary steps included in a shaping (manufacturing method) performed by the layered object manufacturing apparatus according to the embodiment.

A method for manufacturing the layered object 100 with the layered object manufacturing apparatus 1 will now be explained with reference to FIG. 2. As illustrated in FIG. 2, to begin with, the material 121 is supplied, and irradiated with the laser beam 200. The control device 17 controls the supply devices 31 and 31A, and the like so that that the material 12 is supplied from the nozzle 33 to a predetermined area, and controls the light source 41, the galvano scanner 55, and the like so that the supplied material 121 is caused to melt with the laser beam 200. In this manner, the molten material 123 is supplied, in a predetermined amount, to the area on which the layer 110b is to be formed on the base 110a, as illustrated in FIG. 2. When the material 123 is discharged onto the base 110a or the layer 110b, the material 123 deforms, and is turned into a layer-like or thin-film-like aggregation of the material 123. When the material 123 is cooled by the gas (gas) carrying the material 121, or cooled by the heat transfer to the aggregation of the material 121, the material 123 accumulates granularly, and forms a granular aggregation.

The layered object manufacturing apparatus 1 then performs the annealing. The control device 17 controls the light source 41, the melting device 45, and the like in such a manner that the aggregation of the material 123 on the base 110a is irradiated with the laser beam 200. In this manner, the aggregation of the material 123 is caused to melt again, and is turned into the layer 110b.

The layered object manufacturing apparatus 1 then measures the shape. The control device 17 controls the measuring device 16 to measure the material 123 on the base 110a having been applied with the annealing. The control device 17 compares the shape of the layer 110b or the shape of the layered object 100 acquired by the measuring device 16 with the reference shape stored in the storage unit 17a.

The layered object manufacturing apparatus 1 then performs trimming. If the material 123 on the base 110a is determined to adhere to a position in a shape outside of the predetermined shape, for example, through the shape measurement and the comparison with the reference shape, the control device 17 controls the light source 41, the removing apparatus 46, and the like to vaporize the unnecessary material 123. If the layer 110t is determined to have the predetermined shape through the shape measurement and the comparison with the reference shape, the control device 17 does not perform the trimming.

When the formation of the layer 110b described above is completed, the layered object manufacturing apparatus 1 forms another layer 110b on top of the layer 110b. The layered object manufacturing apparatus 1 forms the layered object 100 by accumulating the layers 11010 repetitively.

A detailed configuration and functions of the exemplary nozzle 33 according to the embodiment will now be explained with reference to FIGS. 3 to 5. In the explanation below, an X direction, a Y direction, and a Z direction that are perpendicular to one another are defined for the convenience of explanation. The X direction is left right direction in FIG. 3. The Y direction is the direction perpendicular to the drawing plane of FIG. 3. The Z direction is top-down direction in FIG. 3. The upper surfaces of the stage 12, the layered object 100, the object 110, the base 110a, and the layer 110b extend substantially along a plane across the X and the Y directions. In the layered object manufacturing apparatus 1, at least one of the nozzle 33 and the stage 12 move in the X direction and the Y direction, the nozzle 33 is moved relatively to the stage 12, and the layer 110b of the material 121 is formed across the plane in the X and the Y directions. By sequentially accumulating the layers 110t of the material 121 in the Z direction, a three-dimensional layered object 100 is formed. The X direction and the Y direction may be referred to as a horizontal direction, a lateral direction, for example. The Z direction may be referred to as an upright direction, a vertical direction, a height direction, a thickness direction, a lengthwise direction, for example.

The nozzle 33 has a body 330. The body 330 has an elongated shape and is made of high heat-resistant material such as boron nitride (ceramic material). The longitudinal direction (axial direction) of the body 330 extends along the Z direction, for example. The transverse direction (width direction) of the body 330 extends along the X direction and the Y direction, for example. The body 330 has a cylindrical appearance. The body 330 has a bottom surface 331, a side surface 332, for example, that are the external surfaces (surfaces). The bottom surface 331 is positioned at an end (bottom end) in the longitudinal direction of the body 330, and may also be referred to as an end surface. The bottom surface 331 faces the stage 12, the layered object 100, and the object 110, for example. The bottom surface 331 has a flat shape. The side surface 332 is positioned at an end of the body 330 in the transverse direction, and may also be referred to as a circumferential surface. The side surface 332 is configured as a cylindrical surface.

Three openings 333 to 335 are provided on the bottom surface 331 of the body 330. The opening 333 that is positioned at the center among the openings 333 to 335 outputs the laser beam 200, and ejects the powder of the material 121. The open end 333a of the opening 333 has a circular shape, as illustrated in FIG. 4. The open end 333a of the opening 333 has a diameter larger than the diameter of the light path (light flux) of the laser beam 200, as illustrated in FIG. 3. Therefore, the powder of the material 121 can be supplied to the processing area inside of and around the light flux of the laser beam 200.

Figure 3:
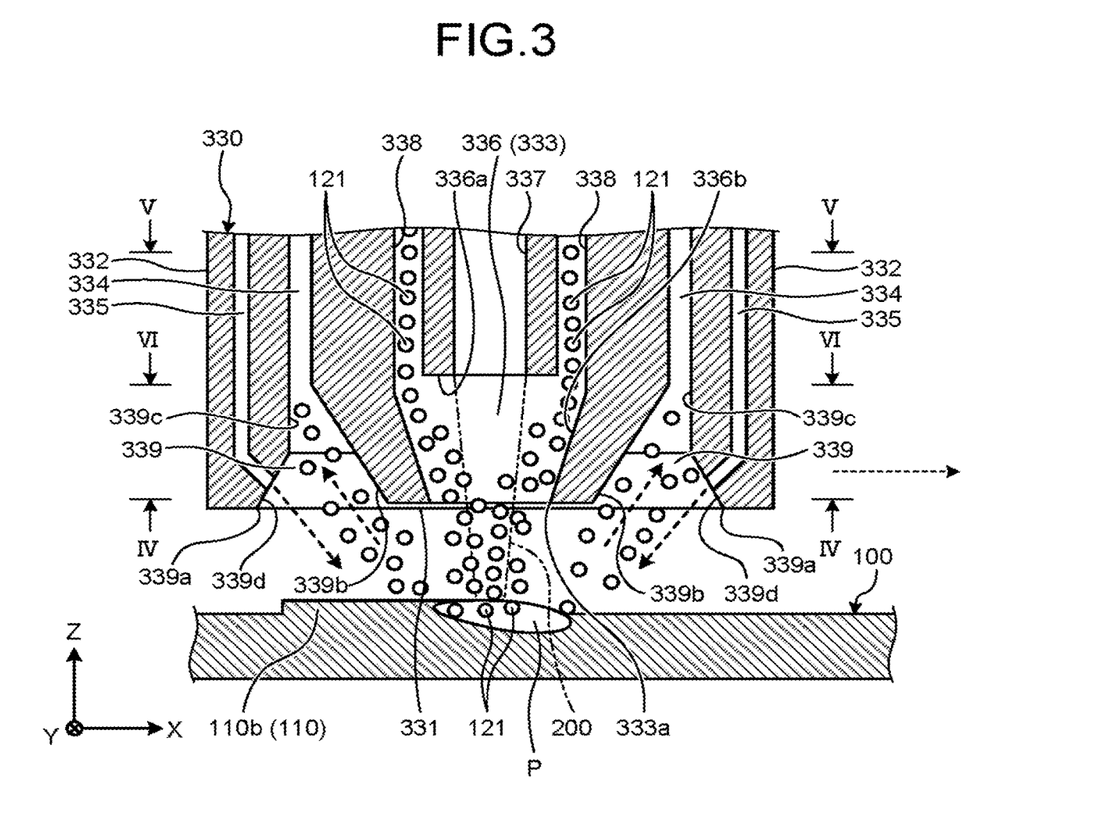
FIG. 3 is a cross-sectional view of the tip of an exemplary nozzle according to the embodiment.

As illustrated in FIG. 3, a room 336 (recess) is formed on the open end 333a (tip) of the opening 333. The room 336 is provided as a part of the opening 333. The room 336 is formed by a bottom surface 336a and a side surface 336b (circumferential surface) as internal surfaces (surfaces). The bottom surface 336a has a flat circular shape, for example. Alternatively, the bottom surface 336a may have a conical surface protruding toward the direction in which the laser is output (toward the bottom in FIG. 3). The side surface 336b is a conical surface. The diameter of the side surface 336b becomes gradually smaller toward the direction in which the laser is output (toward the bottom in FIG. 2). The side surface 336b is a curved concaved surface having an internal diameter becoming gradually smaller in the direction in which the laser is output.

An opening 337 is provided at the center of the bottom surface 336a. The opening 337 extends along the longitudinal direction of the body 330. The cross section of the opening 337 in the transverse direction, that is, the direction perpendicular to the longitudinal direction, has a circular shape. The opening 337 may have a diameter gradually becoming smaller toward the tip. The laser beam 200 enters the opening 337 via the cable 210, for example. The opening 337 is a passage of the laser beam 200, and is an example of an output port. The body 330 is an example of a laser output part (laser output component, laser output portion).

An opening 338 is formed around the opening 337. The opening 338 extends along the longitudinal direction of the body 330. The opening 338 is provided adjacent to the side surface 336b of the room 336. As illustrated in FIG. 5, the cross section of the opening 338 in the transverse direction has an annular shape. The cross section of the opening 338 may have an arc- and slit-like shape. The opening 338 is connected to the supply device 31 via the supply pipe 34, for example. The opening 338 is a passage of the powder of the material 121. The opening 338 is an example of an ejection port, an example of a material supply port, and an example of a gas inlet. The body 330 is an example of an ejecting part (ejecting component, ejecting portion), an example of a material supplying part (material supplying component, material supplying portion), is an example of a gas charging part (gas discharging component, gas discharging portion).

Figure 4:
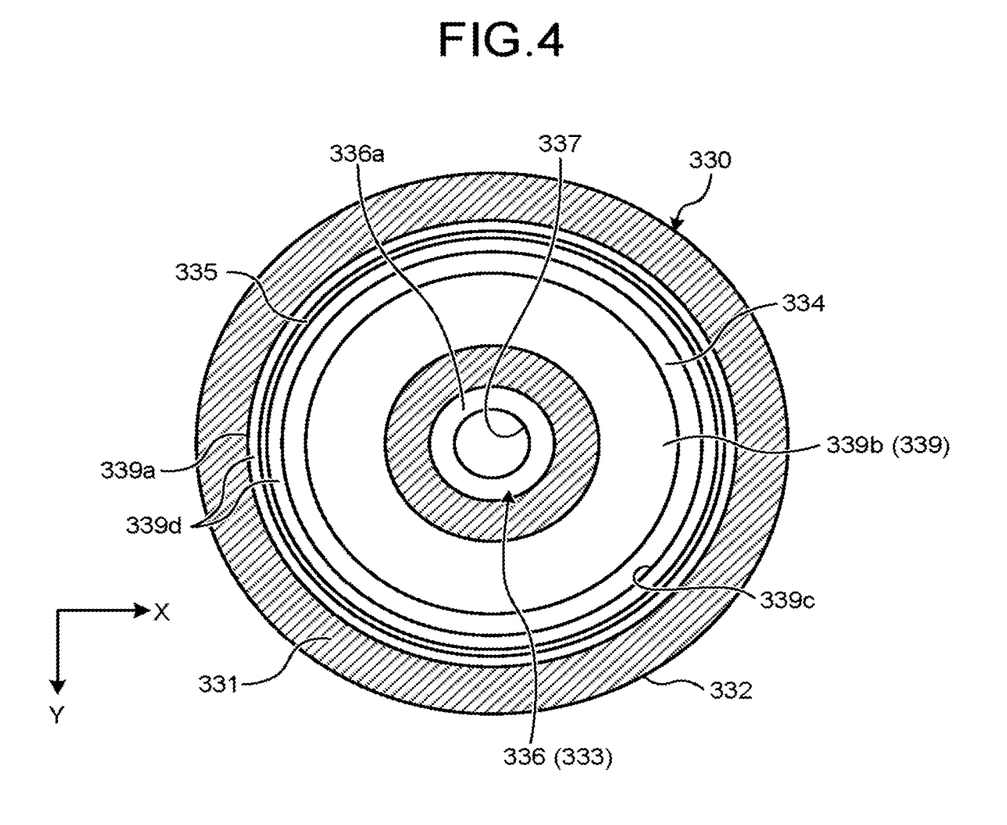
FIG. 4 is a cross-sectional view of the exemplary nozzle according to the embodiment across the position IV-IV in FIG. 3.
Figure 5:
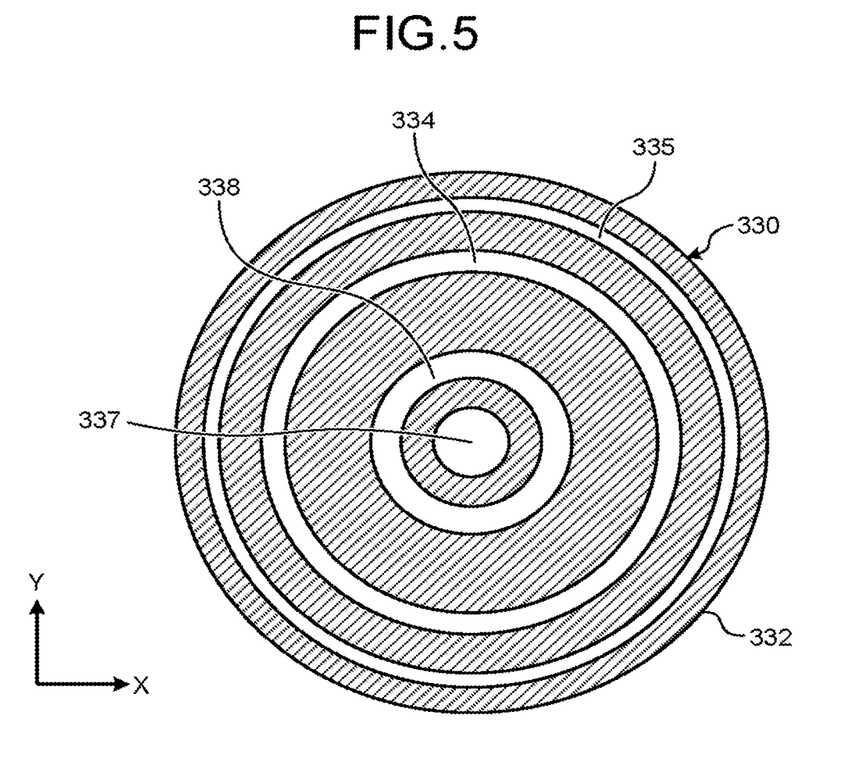
FIG. 5 is a cross-sectional view of the exemplary nozzle according to the embodiment across the position V-V in FIG. 3.

As illustrated in FIGS. 3 and 4, a recess 339 is provided on the bottom surface 331. The recess 339 is provided in an annular shape surrounding the room 336 with a distance, and is concaved toward the direction opposite to the direction in which the laser is output. An open end 339a has a round shape. The openings 334 and 335 are provided on the bottom of the recess 339 (on the upper side in FIG. 3). The recess 339 is formed by circumferential surfaces 339b, 339c, and 339d that are internal surfaces (surfaces). The circumferential surface 339b is a conical surface (tapered surface). The diameter of the circumferential surface 339b increases gradually in a direction away from the tip (the open end 339a) (in the upward direction in FIG. 3). The circumferential surface 339b is a curved convex surface that is inclined with respect to the longitudinal direction. The circumferential surface 339c is a tubular, cylindrical internal surface. The circumferential surface 339c is continuous to the surface of the opening 334. The circumferential surface 339d is a conical surface. The diameter of the circumferential surface 339d increases gradually toward the tip (toward the bottom in FIG. 3). The circumferential surface 339d is a curved concave surface that is inclined with respect to the longitudinal direction. The opening 334 is provided on the bottom side of the circumferential surfaces 339b and 339c, and the opening 335 is provided on the circumferential surface 339d.

The opening 334 extends in the longitudinal direction of the body 330. As illustrated in FIG. 5, the cross section of the opening 334 in the transverse direction has an annular shape. As illustrated in FIG. 4, the opening 334 is provided adjacent to the circumferential surface 339c. The opening 334 is connected to the gas discharging device 32 via the discharging pipe 35, and the like. The opening 334 is used as a passage for discharging (collecting) the gas, the material 121, the fume (carbonized material), and the like. The opening 334 is an example of a gas outlet. The body 330 is an example of a gas discharging part (gas discharging component, gas discharging portion).

The opening 335 is provided around the opening 334. The opening 335 extends along the longitudinal direction of the body 330. As illustrated in FIG. 5, the cross section of the opening 335 in the transverse direction has an annular shape. The tip of the opening 335 is bent diagonally toward the center of the body 330 (toward the central axis, toward the inner side in the radial direction). The opening 335 is connected to the supply device 31A via the supply pipe 34A, and the like. The opening 335 is a passage for supplying the gas to the processing area. The opening 335 is an example of a gas inlet. The body 330 is an example of a gas charging part (gas charging component, gas charging portion).

In the nozzle 33 having such a configuration, before the powder of the material 121 is ejected from the body 330, a part of the powder of the material 121 is irradiated with the laser beam 200 in the opening 333 (in the room 336), as illustrated in FIG. 3. In other words, because the powder of the material 121 (or at least a part of the powder of the material 121) is heated preliminarily in the room 336, the material 121 tends to soften or melt in an early stage. Because the material 121 scatters less compared with when the material 121 is ejected from the nozzle 33 as powder, for example, the material 121 may be supplied more reliably or more efficiently to a molten pool P. Furthermore, in the embodiment, because the laser beam 200 passes through the center of the room 336, and the opening 338 from which the powder of the material 121 is ejected is adjacent to the side surface 336b that is offset from the center of the room 336, the gas containing the powder of the material 121 is ejected a position offset from the laser beam 200, and flows along the side surface 336b. Therefore, it is possible to prevent excessive softening and melting of the material 121 in the room 336.

As described above, in the embodiment, the body 330 of the nozzle 33 has the opening 333 from which the laser beam 200 is output, and from which the powder of the material 121 is ejected. Therefore, at least a part of the powder of the material 121 is softened, or is caused to melt by the laser beam 200 at an earlier stage, compared with a configuration in which the powder of the material 121 is ejected from the nozzle 33, and then caused to melt by being irradiated with the laser beam 200. Therefore, the material 121 may be supplied to the molten pool P more reliably or more efficiently, for example.

In a configuration in which an opening for the material powder and an opening for the laser beam are provided separately, as in the conventional nozzle, the nozzle is sometimes configured to discharge the material powder diagonally from a position around the laser beam, toward the position at which the laser beam is condensed. In such a configuration, if the nozzle is moved upwardly or downwardly with respect to the object to ensure a larger laser beam diameter (irradiated area, melting area) on the object, for example, the position of the material discharged toward the position at which the laser beam is condensed may be vertically offset from the melting area. Such a configuration does not quite allow the material to reach the melting area (molten pool P, see FIG. 3). It has been therefore difficult for such a conventional configuration to change the laser beam diameter by changing the distance between the nozzle and the object. By contrast, in the embodiment, because the powder of the material 121 (at least a part of the powder of the material) is caused to melt, by the laser beam 200 at a relatively early stage, the powder of the material 121 drops to the molten pool P, along with the laser beam 200. Therefore, even when the distance between the nozzle and the object changes, it is easier to suppress supplying the powder of the material 121 to positions offset from the processing area. Therefore, the nozzle 33 (the body 550), the stage 12, and the like can be moved vertically more easily in order to change the diameter (size, area) of the laser beam 200. Specifically, the laser beam 200 may be set to a smaller diameter for a portion requiring shaping at higher precision, and set to a larger diameter for a portion requiring quicker shaping, for example. Before the layer 101b is formed at each position, for example, the control device 17 refers to the storage unit 17a to acquire the data representing the height of the nozzle 33 corresponding to the position, and sets the height of the nozzle 33 based on such data. The control device 17 then forms the layer 101b by controlling the units to output the laser beam 200 while supplying the powder of the material 121. Executed by repeating this process is a step of executing shaping (forming the layer 110b) with a first distance set to the height of the nozzle 33, that is, to the distance between the nozzle 33 (the body 330) and the object 110, and a step of executing shaping with a second distance between the nozzle 33 and the object 110, that is different from the first distance.

In the embodiment, the open end 333a (open end portion) of the opening 333 has the room 336, and the opening 337 (output port) from which the laser beam 200 is output and the opening 338 (ejection port) from which the powder of the material 121 is ejected are provided on the room 336. A space for allowing the laser beam 200 to preliminarily heat a part of the powder of the material can therefore be provided the room 336. Furthermore, preferred softened or molten condition of the material 121 can be achieved more easily, by changing the specifications of the room 336, such as the shape and the size of the room 336, positions of the openings 337 and 336, and the size of the open end 333a with respect to the diameter of the light path of the laser beam 200, for example.

Furthermore, in the embodiment, because the opening 338 forms an annular passage, variations can be reduced in the distribution of the powder of the material 121, for example.

Furthermore, in the embodiment, the opening is provided adjacent to the side surface 336b (circumferential surface) of the room 336. Therefore, the powder of the material 121 flows easily along the side surface 336b, making it difficult to preliminarily heat the powder of the material 121 by the laser beam 200 too early, for example.

Furthermore, in the embodiment, the opening 335 (gas inlet) is provided around the opening 333, and the opening 334 (gas outlet) is provided between the opening 333 and the opening 335. Therefore, the gas supplied from the opening 335 can be used as shielding gas. Therefore, the scattering of the powder of the material 121 unused in the shaping and fume generated by shaping is more easily suppressed, for example. Furthermore, the powder of the material 121 and the fume can be discharged more efficiently via the opening 334 inside of the shield implemented by the gas flow from the opening 335. The shielding gas can suppress oxidation during sintering. According to the embodiment, the shielding gas can be used not only for suppressing oxidation during the sintering but also in suppressing scattering of the powder, as well as for improving the efficiency at which unnecessary powder is discharged.

Figure 6:
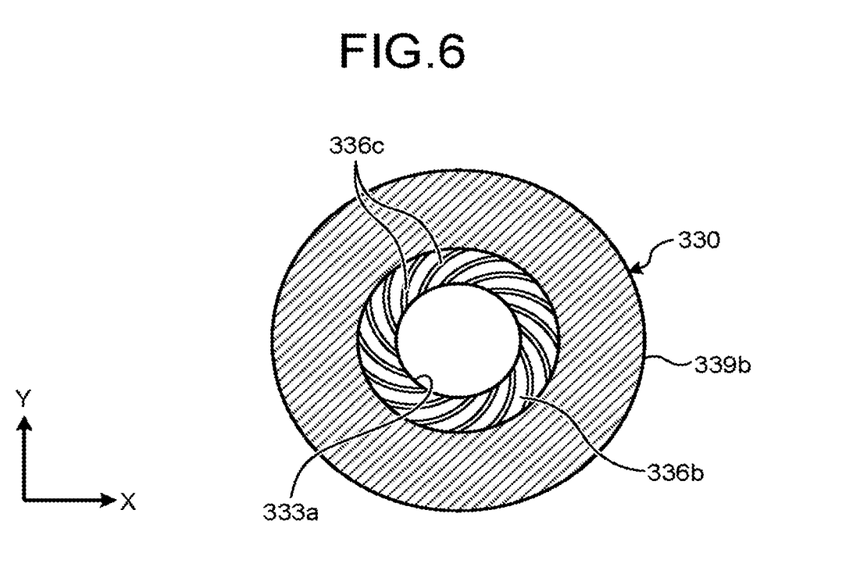
FIG. 6 is a cross-sectional view of a nozzle according to a modification across a position equivalent to the position VI-VI in FIG. 3.
Figure 7:
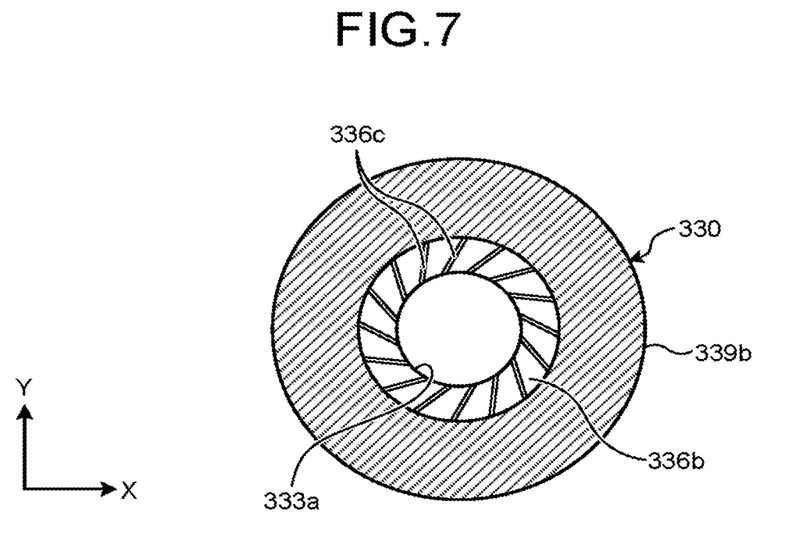
FIG. 7 is a cross-sectional view of a nozzle according to another modification across a position equivalent to the position VI-VI in FIG. 3.

FIG. 6 is a cross-sectional view of the body 330 of the nozzle 33 according to a modification, across a position equivalent to the line VI-VI in FIG. 3. In this modification, a plurality of helical (swirling) grooves 336c (guide portions) are provided on the side surface 336h (circumferential surface, internal circumferential surface, internal surface) of the room 336 (the opening 333). The grooves 336c may extend across the open end 333a to a bottom 336a, for example. With the grooves 336c, the gas containing the powder of the material 121 that is ejected from the opening 338 (ejection port) flows helical (swirling) along the grooves 336c. In this manner, the powder of the material 121 may be supplied more efficiently. The grooves 336c (the guides) may also be linear, as illustrated in FIG. 7. These guides may be provided as helical protrusions (ribs, walls, ridges).

Figure 8:
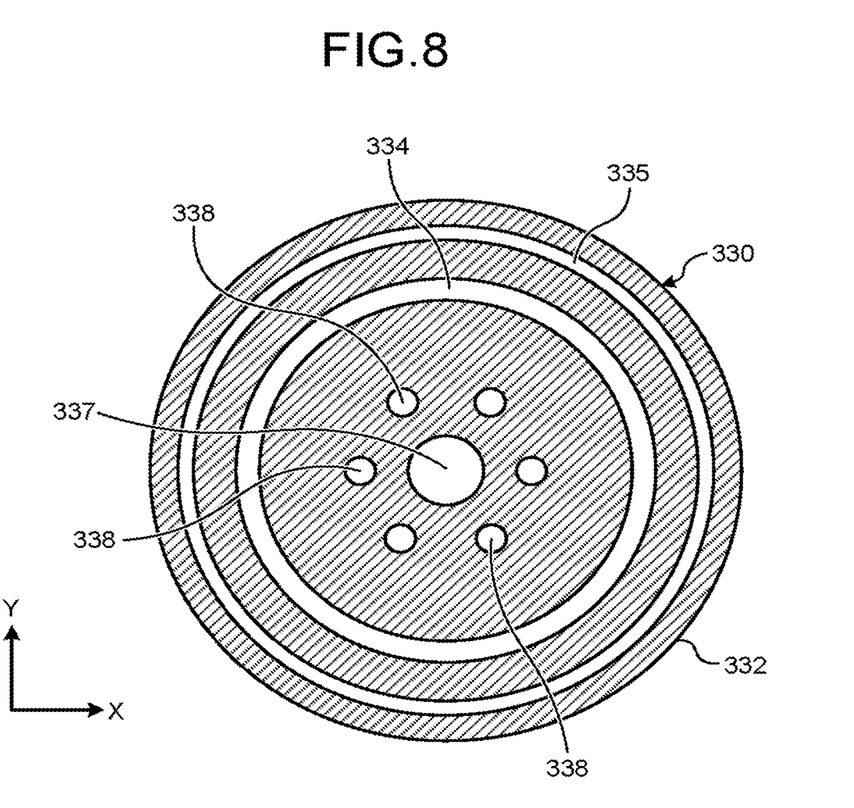
FIG. 8 is a cross-sectional view of a nozzle according to another modification across a position equivalent to the position V-V in FIG. 3.

FIG. 8 is a cross-sectional view of the body 330 of the nozzle 33 according to another modification, across a position equivalent to the line V-V in FIG. 3. In this modification, the body 330 is provided with a plurality of the openings 338 (six in the example illustrated FIG. 8). The openings 338 are positioned substantially at an equal interval along the circumferential direction of the body 330. In this manner, the powder of the material 121 may be supplied more efficiently. Furthermore, because only required in this configuration is processing a plurality of holes, the burden in manufacturing the body 330 may be reduced.

Although some exemplary embodiment and modifications of the present invention are explained above, these embodiment and modifications are merely exemplary, and are not intended to limit the scope of the present invention in any way. These embodiment and modifications may be implemented in different ways, and various omission, replacements, combinations, and modifications are still possible within the scope not deviating from the essence of the present invention. The embodiment and the modifications of the embodiment fall within the scope and the essence of the present invention, and are within the scope of the present invention described in the appended claims and their equivalent. The present invention may be implemented differently from the configurations and control (technical features) disclosed in the embodiment and the modifications. Furthermore, with the present invention, at least one of the various results (including the effects and the derivative effects) achieved by the technical features can be achieved.

The invention claimed is:

1. A nozzle for a layered object manufacturing apparatus, the nozzle comprising a body, wherein
   the body includes a first recess that opens to outside of the body, an internal bottom surface and an internal circumferential surface of the first recess, an output port from which an energy beam is output, and an ejection port from which powder of a material is ejected,
   the output port is provided on the internal bottom surface and opens to the first recess through which the energy beam passes,
   the ejection port is formed around the output port and opens to the first recess through which the powder passes, and
   an internal diameter of the internal circumferential surface becomes gradually smaller in a direction in which the energy beam is output from the output port to outside of the body through the first recess.

2. The nozzle according to claim 1, wherein
   the body includes a gas inlet from which gas is supplied to outside of the body and a gas outlet from which gas is suctioned from outside of the body,
   the gas inlet has an annular shape surrounding the first recess, and
   the gas outlet has an annular shape and is located between the first recess and the gas inlet.

3. The nozzle according to claim 2, wherein,
   the body includes an annular second recess that opens to outside of the body and surrounds the first recess, and
   the gas inlet and the gas outlet open to the second recess.

4. The nozzle according to claim 1, wherein the ejection port is provided outside of the output port.

5. The nozzle according to claim 1, wherein the ejection port is provided in a manner surrounding the output port.

6. The nozzle according to claim 1, wherein the ejection port is provided in plurality.

7. The nozzle according to claim 1, wherein the ejection port opens in contact with the internal circumferential surface.

8. The nozzle according to claim 1, wherein the internal circumferential surface is provided with a guide for guiding the powder in a swirling manner along the internal circumferential surface.

9. A layered object manufacturing apparatus comprising:
   a light source that generates an energy beam;
   the nozzle according to claim 1;
   a supplying unit that supplies the material to the nozzle; and
   a moving mechanism that moves a manufactured object and the nozzle relatively to each other.

* * * * *